(12) United States Patent
Dawson

(10) Patent No.: US 11,825,173 B1
(45) Date of Patent: Nov. 21, 2023

(54) VALUE GENERATION FOR DISTRIBUTED VIDEO CONTENT VERIFICATION

(71) Applicant: SONY GROUP CORPORATION, Tokyo (JP)

(72) Inventor: Thomas Dawson, Escondido, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/949,898

(22) Filed: Sep. 21, 2022

(51) Int. Cl.
  *H04N 21/647* (2011.01)
  *H04N 21/431* (2011.01)

(52) U.S. Cl.
  CPC ... *H04N 21/64715* (2013.01); *H04N 21/4312* (2013.01); *H04N 21/64723* (2013.01)

(58) Field of Classification Search
  None
  See application file for complete search history.

(56) References Cited

U.S. PATENT DOCUMENTS 7,961,949 B2  6/2011  Levy et al.

FOREIGN PATENT DOCUMENTS

BR    PI1003850 B1    8/2020
CN    111917558 B     3/2021

*Primary Examiner* — Omar S Parra
(74) *Attorney, Agent, or Firm* — CHIP LAW GROUP

(57) ABSTRACT

An electronic device and a method for value generation for distributed video content verification are disclosed. The electronic device receives a first media file corresponding to a video. The electronic device retrieves color values of each row in a frame of a plurality of frames from the video. The electronic device determines a first value for each row in the frame. The electronic device combines the first value for a predefined set of frames to determine a second value. The electronic device retrieves audio values for the plurality of frames to determine a third value, in case the video includes an audio component. The electronic device determines first information based on the second value and the third value. The electronic device transmits the first information to a plurality of databases for storage. The first information determines whether a second media file is unaltered or not.

20 Claims, 7 Drawing Sheets

VALUE GENERATION FOR DISTRIBUTED VIDEO CONTENT VERIFICATION

This application also makes reference to U.S. application Ser. No. 17/949,846, which was filed on Sep. 21, 2022. The above stated Patent Application is hereby incorporated herein by reference in its entirety.

FIELD

Various embodiments of the disclosure relate to media files. More specifically, various embodiments of the disclosure relate to an electronic device and method for value generation for distributed video content verification.

BACKGROUND

Advancements in software technology have led to an increase in generation and consumption of media files. Examples of the media files may include, but are not limited to, videos, images, audios, graphics, animation, or multimedia. Oftentimes, the media files may be modified or tampered by a user and the changes may be unnoticeable. The user may alter the media file using various computer applications or online tools. For example, the user may remove certain portion of an original video and add certain extra frames in the original video that may not be present in the original video. In some cases, the media file may include information that may be critical for some purposes, such as, for legal proceedings, surveillance, and the like. Hence, an authenticity or integrity of a media file may need to be determined. For example, an accused party may present a tampered video in a court of law. The court may issue an erroneous decision based on the tampered video. Therefore, the authenticity of the video may need to be established.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for value generation for distributed video content verification is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
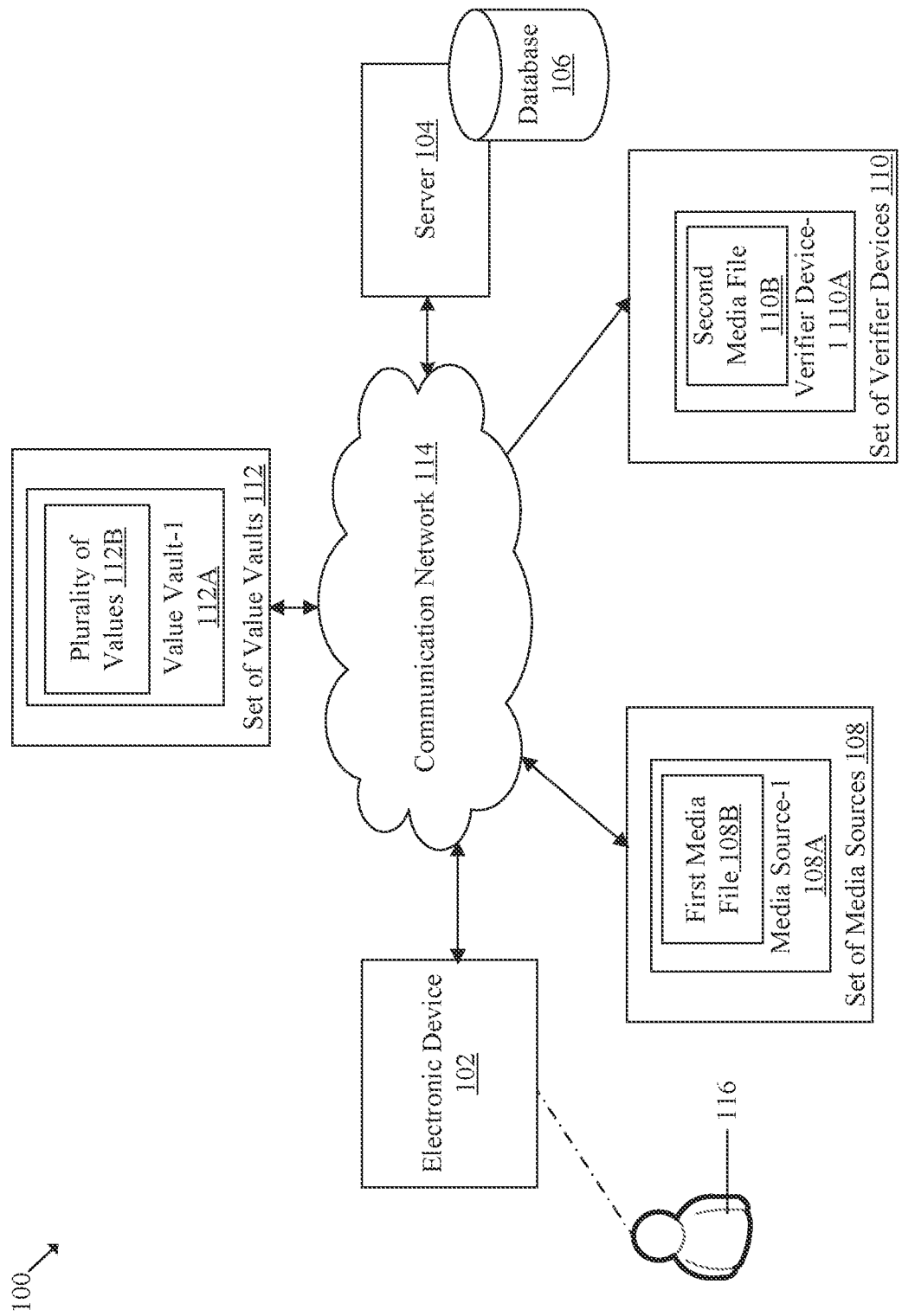
FIG. 1 is a block diagram that illustrates an exemplary network environment for implementation of value generation for distributed video content verification, in accordance with an embodiment of the disclosure.

The following described implementation may be found in the electronic device and method for value generation for distributed video content verification. Exemplary aspects of the disclosure may provide an electronic device that may generate values for distributed video content verification. The electronic device may receive a first media file corresponding to one of a pre-recorded video or a live video. The electronic device may retrieve one or more color values of each row in a frame of a plurality of frames associated with the received first media file. The electronic device may further determine a first value (e.g., a sum or average value of each pixel) for each row in the frame of the received first media file, based on the retrieved one or more color values. The electronic device may further combine the determined first value for a predefined set of frames of the plurality of frames associated with the received first media file. The electronic device may further determine a second value based on the combination (e.g., a sum or an average) of the determined first value for each of the predefined set of frames of the plurality of frames. The electronic device may further determine whether an audio component is included in the received first media file or not. The electronic device may further retrieve one or more audio values for the plurality of frames associated with received first media file, based on the determination that the audio component is included in the received first media file. The electronic device may determine a third value, based on the retrieved one or more audio values. The electronic device may further determine first information associated with the received first media file, based on the determined second value and the determined third value. For example, the first information may correspond to a sum, an average, or a weighted average of the determined second value and the determined third value. The electronic device may transmit the determined first information associated with the received first media file to a plurality of databases for storage, wherein each database of the plurality of databases may be associated with a separate entity. The first information may be used to determine whether a second media file, corresponding to the received first media file, is unaltered or not. For example, second information may be determined based on, for example, content of the second media file. Further, the determined second information may be compared with the first information retrieved from each of the independently maintained databases to determine whether the second media file is unaltered and authentic.

Typically, video files may be modified by a user using various computer applications or online tools. For example, the user may remove certain frames of an original video and add certain extra frames in the video that may not be present in the original video. In some cases, the original video may include information that may be critical for some purposes, such as, in case of legal proceedings or surveillance. Hence, an authenticity of the video may need to be determined. The electronic device of the disclosure may retrieve color values for a frame of a media file (e.g., the first media file) and aggregate the determined color values to obtain a first value. Further, the first value across multiple frames of the media files may be combined to obtain a second value. In cases where the media file (i.e., the first media file) includes an audio component, audio values may be retrieved from the media file and combined together to obtain a third value. In case, the media file (i.e., the first media file) corresponds to a video, the second value and the third value may be combined to obtain first information. The first information may be used at a later time to verify an integrity of a media file (e.g., the second media file) corresponding to the original media file (i.e., the first media file), based on a comparison of second information associated with the media file to be verified (i.e., the second media file) with respect to the first information associated with the original media file (i.e., the first media file).

The electronic device may transmit the determined first information associated with the original media file (i.e., the first media file) to a plurality of databases for storage, wherein each database of the plurality of databases may be associated with the separate entity. The transmitted first information may be retrieved from each database of the plurality of databases, and the retrieved first information may be used to determine whether the second media file, corresponding to the received first media file, is unaltered or not. As the first information may be transmitted to multiple databases that may be maintained by separate entities, in cases where values in the first information are altered at one of the databases, the corresponding values in the first information stored at the other databases may still be unaffected. In other words, the first information may be stored in silos at each database and change of values of the first information in one database may not affect the first information stored at the other databases. Thus, the first information stored on the multiple databases, that may be maintained by separate entities, may be robust to alterations. As the first information may be robust to alterations, when the first information is retrieved from each such database, an authenticity and integrity of the second media file (that may correspond to the first media file) may be accurately verified, based on the retrieved first information.

FIG. 1 is a block diagram that illustrates an exemplary network environment for implementation of value generation for distributed video content verification, in accordance with an embodiment of the disclosure. With reference to FIG. 1, there is shown a network environment 100. The network environment 100 may include an electronic device 102, a server 104, a database 106, a set of media sources 108 (including a media source-1 108A), a set of verifier devices 110 (including a verifier device-1 110A), a set of value vaults 112 (including a value vault-1 112A), and a communication network 114. The media source-1 108A may include a first media file 108B. The verifier device-1 110A may include a second media file 110B. The value vault-1 112A may include a plurality of values 112B including, for example, first information associated with the first media file 108B. The set of value vaults 112 may be implemented by the database 106. Further, the set of media sources 108 or the set of verifier devices 110 or a combination thereof may be implemented by the electronic device 102. The electronic device 102, the server 104, the database 106, the set of media sources 108, the set of verifier devices 110, and the set of value vaults 112 may be communicatively coupled to one another, via the communication network 114. In FIG. 1, there is further shown a user 116, who may be associated with or operate the electronic device 102.

The electronic device 102 may include suitable logic, circuitry, interfaces, and/or code that may be configured receive the first media file (such as, the first media file 108B) corresponding to one of a pre-recorded video or a live video. The electronic device 102 may retrieve one or more color values of each row in a frame of a plurality of frames associated with the received first media file (such as, the first media file 108B). The electronic device 102 may determine a first value for each row in the frame of the received first media file (such as, the first media file 108B) based on the retrieved one or more color values. The electronic device 102 may combine the determined first value for a predefined set of frames of the plurality of frames associated with the received first media file (such as, the first media file 108B). The electronic device 102 may determine a second value based on the combination of the determined first value for each of the predefined set of frames of the plurality of frames. The electronic device 102 may determine whether an audio component is included in the received first media file (e.g., the first media file 108B). The electronic device 102 may retrieve one or more audio values for the plurality of frames associated with received first media file (such as, the first media file 108B), based on the determination that the first media file (such as, the first media file 108B) includes the audio component. The electronic device 102 may determine a third value, based on the retrieved one or more audio values. The electronic device 102 may further determine first information associated with the received first media file, based on the determined second value and the determined third value. Examples of the electronic device 102 may include, but are not limited to, a computing device, a smartphone, a cellular phone, a mobile phone, a gaming device, a mainframe machine, a server, a computer workstation, and/or a consumer electronic (CE) device.

The server 104 may include suitable logic, circuitry, and interfaces, and/or code that may be configured to determine the first information associated with the received first media file (such as, the first media file 108B) based on the determined second value and the determined third value. The server 104 may be configured to transmit the determined first information associated with the received first media file to a plurality of databases, such as, the set of value vaults 112, for storage. Each database of the plurality of databases may be associated with a separate entity. The transmitted first information may be retrieved from each database of the plurality of databases, and the retrieved first information may be used to determine whether a second media file (such as, the second media file 110B) corresponding to the received first media file (such as, the first media file 108B) is unaltered. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities.

In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the first information. The database 106 may be derived from data off a relational or non-relational database, or a set of comma-separated values (csv) files in conventional or big-data storage. The database 106 may be stored or cached on a device, such as a server (e.g., the server 104) or the electronic device 102. The device storing the database 106 may be configured to receive a query for the first information. In response, the device of the database 106 may be configured to retrieve and provide the queried first information to the electronic device 102 based on the received query.

In some embodiments, the database 106 may be hosted on a plurality of servers stored at same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The set of media sources 108 may include suitable logic, interfaces, circuitry, and/or code that may be configured to generate, receive, and/or store media files. For example, the media source-1 108A of the set of media sources 108 may be configured to store the first media file 108B. The set of media sources 108 may be further configured to determine the first information associated with each of the stored media files. The set of media sources 108 may transmit the determined first information associated with the media file to each of the set of value vaults 112 for storage. For example, the media source-1 108A may transmit the first information associated with the first media file 108B to the set of value vaults 112, including the value vault-1 112A, for storage. Examples of each of the set of media sources 108 may include, but are not limited to, a media generation engine, an imaging device, a video recorder, a camera, a digicam, a computing device, a smartphone, a cellular phone, a mobile phone, a gaming device, a mainframe machine, a server, a computer workstation, a database, and/or a consumer electronic (CE) device.

The set of verifier devices 110 may include suitable logic, interfaces, circuitry, and/or code that may be configured to generate, receive, and/or store media files to be verified. For example, the verifier device-1 110A of the set of verifier devices 110 may be configured to store the second media file 110B. The set of verifier devices 110 may be further configured to transmit the stored media files to the electronic device 102, for verification. For example, the verifier device-1 110A of the set of verifier devices 110 may be configured to transmit the stored second media file 110B to the electronic device 102 for verification. In certain embodiments, the set of verifier devices 110 may be further configured to determine second information associated with each of the media file stored on the set of verifier devices 110. In such case, the set of verifier devices 110 may transmit the determined second information along with the stored media file to the electronic device 102, for verification. Examples of each of the set of verifier devices 110 may include, but are not limited to, a media generation engine, an imaging device, a video recorder, a camera, a digicam, a media editing or processing device, a computing device, a smartphone, a cellular phone, a mobile phone, a gaming device, a mainframe machine, a server, a computer workstation, a database, and/or a consumer electronic (CE) device.

The set of value vaults 112 may include suitable logic, interfaces, circuitry, and/or code that may be configured to store the plurality of values 112B. For example, each of the set of value vaults 112 (including the value vault-1 112A) may be configured to store the plurality of values 112B (including, for example, the transmitted first information associated with the first media file 108B, which may be received from the electronic device 102). Each of the set of value vaults 112 may receive a query for the first information associated with the first media file 108B. Based on the received query, each of the set of value vaults 112 may transmit the first information associated with the first media file 108B to the electronic device 102. In an embodiment, each of the set of value vaults 112 may correspond to a database of a plurality of databases, wherein each database of the plurality of databases may be associated with a separate entity (e.g., user or organization). As the plurality of databases may be associated with separate entities, the plurality of databases may have no contact, no cooperation, and/or no collusion with each other. In certain embodiments, each of the set of value vaults 112 may correspond to a node of a distributed ledger. Examples of each of the set of value vaults 112 may include, but are not limited to, a computing device, a smartphone, a cellular phone, a mobile phone, a gaming device, a mainframe machine, a server, a computer workstation, a database, a distributed ledger node, and/or a consumer electronic (CE) device.

The communication network 114 may include a communication medium through which the electronic device 102, the set of media sources 108, the set of verifier devices 110, the set of value vaults 112, and the server 104 may communicate with one another. The communication network 114 may be one of a wired connection or a wireless connection. Examples of the communication network 114 may include, but are not limited to, the Internet, a cloud network, Cellular or Wireless Mobile Network (such as Long-Term Evolution and $5^{th}$ Generation (5G) New Radio (NR)), a satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 114 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In some embodiments, the network environment 100 may include a distributed ledger corresponding to the set of value vaults 112. The distributed ledger may be a decentralized and distributed database system that may maintain an immutable record of data operations or transactions. A set of data operations may be grouped together as a block and may be further linked to a previous block of data operations to form a chain of a plurality of blocks. All blocks of data operations may be stored in a decentralized manner, whereby all participants or nodes store all the plurality of blocks. Further, the distributed ledger may include an operating system which may allow for deployment of the group of smart contracts between multiple parties, for example, the user 116 and the electronic device 102.

The distributed ledger may be a chain of blocks which uses accounts as state objects and a state of each account can be tracked by the chain. The accounts represent identities of users, mining nodes, or automated agents. All the blocks of data operations or the smart contract are associated with the accounts on the chain of blocks. By way of example, and not limitation, the distributed ledger may be an Ethereum blockchain which may use accounts as state objects and a state of each account can be tracked by the Ethereum blockchain. The accounts represent identities of users, mining nodes, or automated agents. All the blocks of data operations or the smart contract are associated with the accounts on the Ethereum Blockchain. The scope of the disclosure may not be limited to the implementation of the distributed ledger as the Ethereum blockchain. In some embodiments, the distributed ledger may be implemented as a Hyperledger blockchain, or a Corda blockchain. Other implementations of the distributed ledger may be possible in the present disclosure, without a deviation from the scope of the present disclosure.

In operation, the electronic device 102 may be configured to receive the first media file 108B corresponding to one of the pre-recorded video or the live video. the pre-recorded video may be one that may have been recorded before the first media file is received by the electronic device 102. The live video may be recorded in real-time, at the time when the first media file is received by the electronic device 102. Details related to the first media file are described further, for example, in FIG. 3 (at 302).

The electronic device 102 may be further configured to retrieve one or more color values such as, the color values of each row in the frame of the plurality of frames associated with the received first media file 108B. An example of the row in the frame associated with the first media file is described, for example, in FIG. 5. For example, each color value may include a red component, a green component, and a blue component. In an example, a color value may include "200" as the red component, "100" as the green component, and "10" as the blue component. The electronic device 102 may select the frame from the plurality of frames and may retrieve one or more color values from each row of the frame. Details related to the retrieval of one or more color values retrieval are described further, for example, in FIG. 3 (at 304).

The electronic device 102 may be configured to determine the first value for each row in the frame of the received first media file 108B, based on the retrieved one or more color values. The first value may represent the retrieved one or more color values as a numeric value. For example, the first value may be obtained based on a conversion of one or more color values from arbitrary size numeric values to a fixed size numeric value. Details related to the first value are described further, for example, in FIG. 3 (at 306).

The electronic device 102 may be further configured to combine the determined first value for the predefined set of frames of the plurality of frames associated with the received first media file 108B. The predefined set of frames may be a subset of the plurality of frames, for which the determined first value may be needed to be combined. The determined first value for the predefined set of frames may be combined so as to reduce a size of data to be transmitted. Details related to the combination of the first value are described further, for example, in FIG. 3 (at 308).

The electronic device 102 may be configured to determine the second value based on the combination of the determined first value for each of the predefined set of frames of the plurality of frames. The second value may be an aggregate value for the predefined set of frames. For example, for every 50 frames, the first values per row per frame of the 50 frames may be combined based on a summation of the determined first value of each frame to determine second value. Details related to the second value determination are described further, for example, in FIG. 3 (at 310).

The electronic device 102 may be configured to determine whether the first media file 108B includes an audio component or not. The electronic device 102 may retrieve one or more audio values for the plurality of frames associated with received first media file 108B, based on the determination that the audio component is included in the first media file 108B. The one or more audio values may correspond to information of an audio component for the plurality of frames associated with received first media file 108B. Details related to the determination of whether the audio component is included in the first media file are described further, for example, in FIG. 3 (at 312). Details related to retrieval of the one or more audio values retrieval are described further, for example, in FIG. 3 (at 314).

The electronic device 102 may be further configured to determine the third value, based on the retrieved one or more audio values. The third value may be represented as a numeric value determined based on an application of a transformation function on the retrieved one or more audio values. Details related to the third value determination are described further, for example, in FIG. 3 (at 316).

The electronic device 102 may be further configured to determine the first information associated with the received first media file 108B, based on the determined second value and the determined third value. In an embodiment, the determined second value and the determined third value may be combined to determine the first information. The first information may be determined from one frame of the video or from the plurality of frames including several frames. Details related to the first information determination are described further, for example, in FIG. 3 (at 318).

The electronic device 102 may be configured to transmit the determined first information associated with the received first media file 108B to the plurality of databases for storage, wherein each database of the plurality of databases may be associated with the separate entity. Examples of the plurality of databases may include, for example, the set of value vaults 112. The transmitted first information may be retrieved from each database of the plurality of databases. The retrieved first information may be used to determine whether the second media file 110B, corresponding to the received first media file 108B, is unaltered or not. When a given media file (e.g., the second media file 110B) is required to be verified for authenticity and determined as unaltered, the first information corresponding to the given media file may be fetched from each of the plurality of databases. The retrieved first information may be compared with the second information of the given media file. For example, the retrieved first information may be compared with the determined second information of the second media file 110B. Details related to the first information transmission are provided further, for example, in FIG. 3 (at 320).

Figure 2:
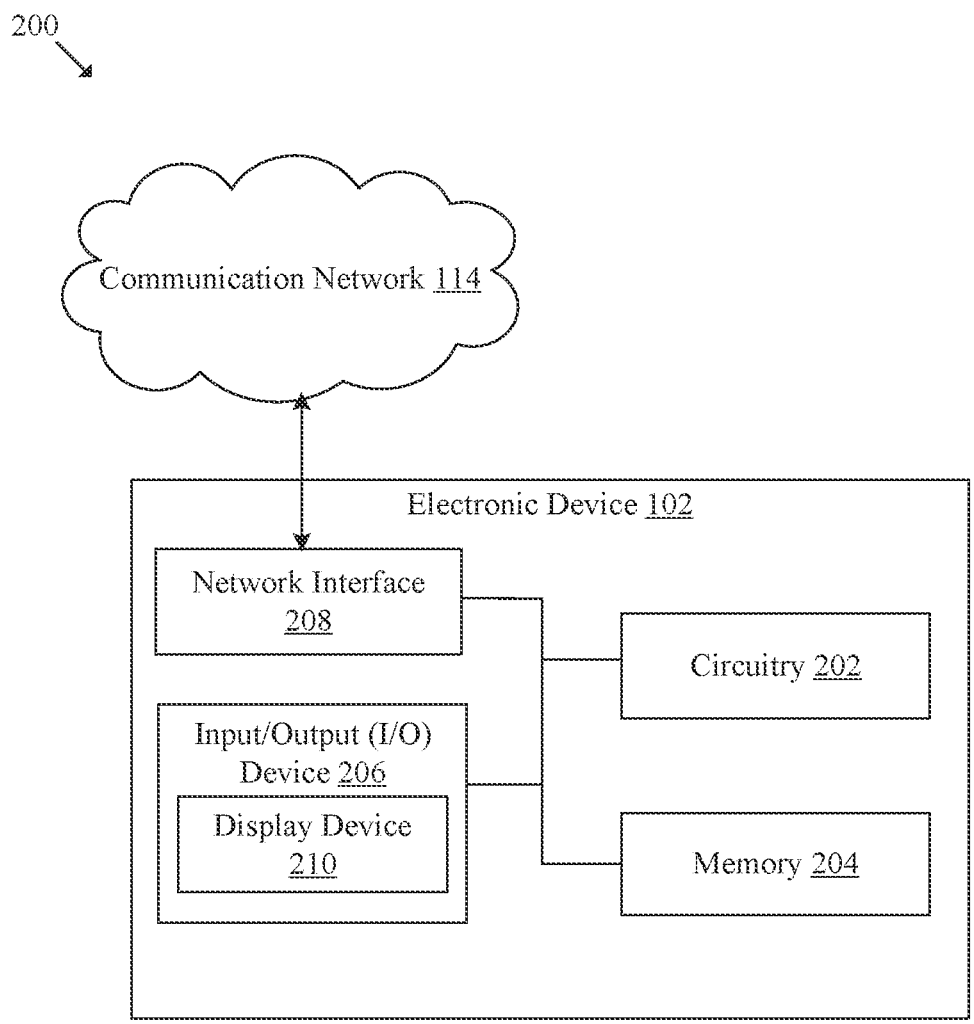
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the exemplary electronic device 102. The electronic device 102 may include circuitry 202, a memory 204, an input/output (I/O) device 206, and a network interface 208. The input/output (I/O) device 206 may include a display device 210.

The circuitry 202 may include suitable logic, circuitry, and/or interfaces that may be configured to execute program instructions associated with different operations to be executed by the electronic device 102. The operations may include the first media reception, the retrieval of color values, the first value determination, the second value determination, the retrieval of audio values, the third value determination, the first information determination, and the first information transmission. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the electronic device 102). The memory 204 may be configured to store media files, such as, the first media file 108B and/or the second media file 110B. The memory 204 may be configured to store the determined first value, the determined second value, the determined third value, and the determined first information. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a first user input indicative of a selection of the first media file 108B and/or the second media file 110B. The I/O device 206 may be further configured to display or render the selected first media file 108B and/or the second media file 110B. The I/O device 206 may be further configured to display whether the second media file 110B is an authentic file and may also display an indication that the second media file 110B is same as (e.g., an unaltered version of) the first media file 108B. The I/O device 206 may include the display device 210. Examples of the I/O device 206 may include, but are not limited to, a display (e.g., a touch screen), a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the electronic device 102, the set of media sources 108, the set of verifier devices 110, the set of value vaults 112, and the server 104, via the communication network 114. The network interface 208 may be implemented by use of various known technologies to support wired or wireless communication of the electronic device 102 with the communication network 114. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display or render the first information, the first media file 108B and/or the second media file 110B. The display device 210 may further display an indication that the second media file 110B is same as (e.g., an unaltered version of) the first media file 108B. The display device 210 may be a touch screen which may enable a user (e.g., the user 116) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for implementation of value generation for distributed video content verification are described further, for example, in FIG. 3.

Figure 3:
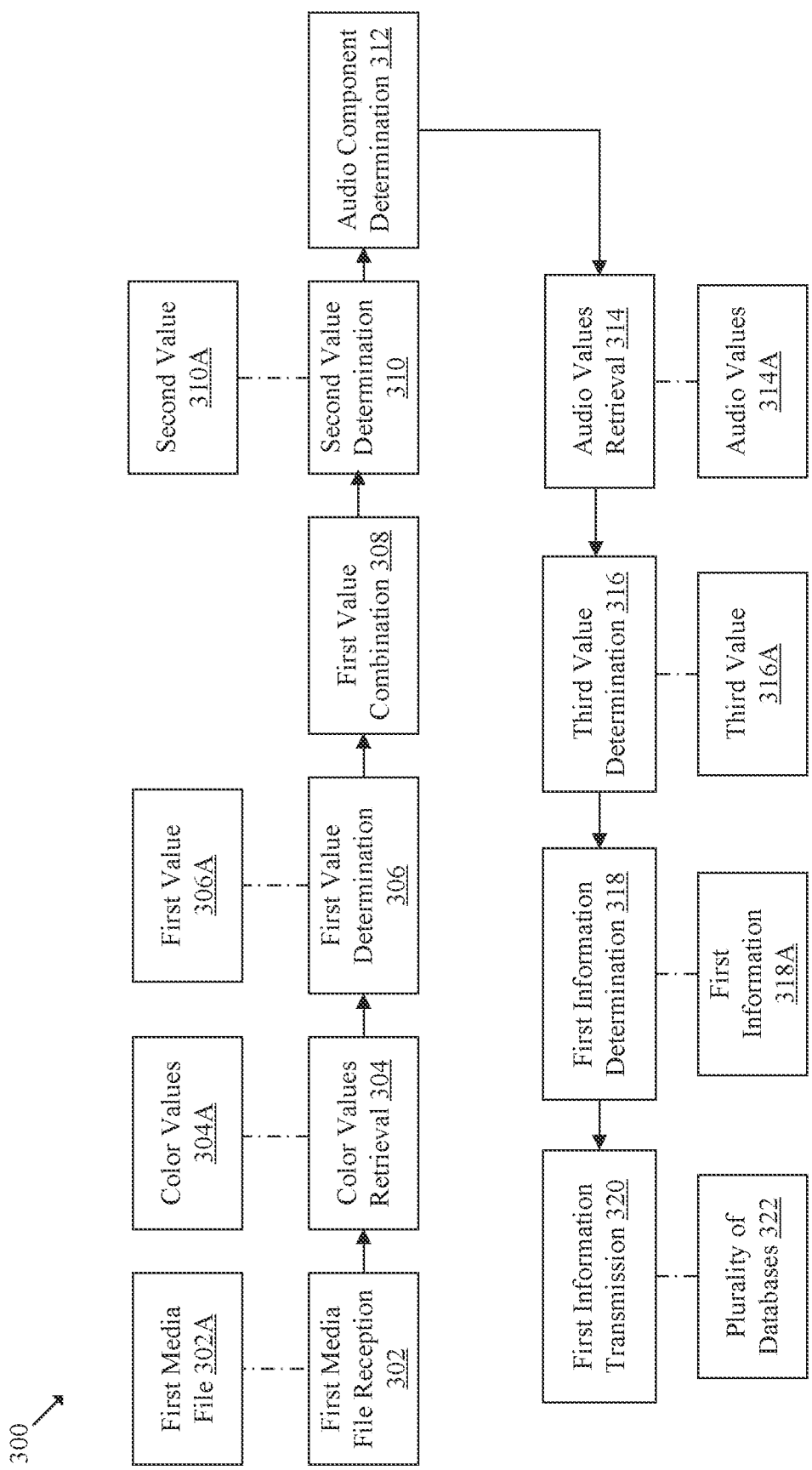
FIG. 3 is a diagram that illustrates an exemplary processing pipeline for implementation of value generation for distributed video content verification, in accordance with an embodiment of the disclosure.

FIG. 3 is a diagram that illustrates an exemplary processing pipeline for implementation of value generation for distributed video content verification, in accordance with an embodiment of the disclosure. FIG. 3 is explained in conjunction with elements from FIG. 1 and FIG. 2. With reference to FIG. 3, there is shown an exemplary processing pipeline 300 that illustrates exemplary operations from 302 to 320 for implementation of value generation for distributed video content verification. The exemplary operations 302 to 320 may be executed by any computing system, for example, by the electronic device 102 of FIG. 1 or by the circuitry 202 of FIG. 2. The exemplary processing pipeline 300 further illustrates a first media file 302A, color values 304A, a first value 306A, a second value 310A, audio values 314A, a third value 316A, first information 318A, and a plurality of databases 322.

At 302, an operation for a first media file reception may be executed. The circuitry 202 may be configured to receive the first media file 302A corresponding to one of the pre-recorded video or the live video. The pre-recorded video may be a video that may be recorded before the first media file 302A and may be received and stored at a storage device such as, the memory 204 of FIG. 2. The first media file 302A may be received based on retrieval of the first media file 302A from the storage device by the electronic device 102. For example, the pre-recorded video may be a CCTV video footage of a back date, a movie, and the like. The live video may be recorded (for example, in a real-time) and simultaneously be communicated to the electronic device 102. For example, the live video may be a live CCTV footage of a bank. The live CCTV footage may be captured by a CCTV camera and sent to the electronic device 102.

At 304, an operation for a retrieval of color values may be executed. The circuitry 202 may be further configured to retrieve one or more color values such as, the color values 304A, of each row in a frame of a plurality of frames associated with the received first media file 302A. An example of a row in a frame associated with the first media file 302A is illustrated, for example, in FIG. 5. In an example, one or more color values may lie in a range between "0" to "255", where "0" may represent a minimum light intensity (such as, a black color) and "255" may represent a maximum light intensity (such as, a white color). Each color value may include the red component, the green component, and the blue component. For example, a color value may include "100" as the red component, "150" as the green component, and "0" as the blue component. It may be appreciated that the frame may be a picture in the video and the video may include a plurality of such frames. The circuitry 202 may select the frame from the plurality of frames and may retrieve one or more color values (such as, the color values 304A) from each row of the frame. In an embodiment, one or more color values may not be equal to the number of pixels in the row. For example, the circuitry 202 may retrieve only 100 color values from a total of 200 pixels in each row of the frame. The retrieved color values may represent color values of a set of pixels (e.g., 100 pixels) sampled from the total number of pixels (e.g., 200 pixels) in the frame of the video. Such sampling of pixels may save storage space and reduce a computation complexity associated with the value generation process. Alternatively, the circuitry 202 may retrieve color values from each pixel of the frame.

At 306, an operation for a first value determination may be executed. The circuitry 202 may be further configured to determine the first value 306A for each row in the frame of the received first media file 302A, based on the retrieved one or more color values, such as, the color values 304A. In an example, the first value 306A may represent the retrieved one or more color values as a numeric value. For example, the first value 306A may correspond to a conversion of one or more color values from arbitrary size numeric values to a fixed size numeric value. For example, one or more color values may include hundred color values such as, a first Red-Green-Blue (RGB) color value of "(100, 10, 180)", a second RGB color value of "(100, 50, 200)", and, a third RGB value of "(10, 40, 180)", and the like. In an embodiment, the first value 306A may be determined for one or more color values of each row based on a hash algorithm that may convert the one or more color values to a string of binary "0" and "1" of a predefined number of bits (e.g., sixteen bits). Alternatively, the first value 306A may be determined for one or more color values of each row based on a summation, an XOR, or an average of the one or more color values. The operations 304 and 306 may be repeated for each row in each frame of the plurality of frames. Thus, the first value 306A may be determined for one or more color values for each row in each frame of the set of frames of the video corresponding to the first media file 302A.

At 308, an operation for a first value combination may be executed. The circuitry 202 may be further configured to combine the determined first value 306A for a predefined set of frames of the plurality of frames associated with the received first media file 302A. The predefined set of frames may be the subset of the plurality of frames whose determined first value (i.e., the first value 306A) may be needed to be combined. Once, the first value 306A for each row of each frame of the predefined set of frames is determined, the determined first value 306A may be combined for the predefined set of frames. For example, for every 10 frames (i.e., the predefined set of frames), the first value 306A per row per frame of the set of 10 frames may be combined based on an XOR, a summation, a difference, or an average of the first value 305A for each row of each frame of the set of 10 frames. As the plurality of frames may include a number of frames such as, 10,000 frames, a combination of the determined first value 306A for the predefined set of frames (e.g., 10 frames) may lead to loss of data. In current case, for example, the circuitry 202 may determine 1000 combined values for the 10,000 frames, such that each combined value is a combination of a set of 10 frames from the 10,000 frames. However, the combination of values of the predefined set of frames may reduce time required to transmit data, storage space requirements, and bandwidth requirements.

At 310, an operation for a second value determination may be executed. The circuitry 202 may be configured to determine the second value 310A based on the combination of the determined first value 306A for each of the predefined set of frames of the plurality of frames. The second value 310A may be an aggregated value for the predefined set of frames and may be determined based on the combination of the determined first value 306A for the predefined set of frames of the plurality of frames. For example, for every 20 frames, the first values per row per frame of the 20 frames may be combined based on a summation of the determined first value 306A of each frame to determine the second value 310A. It may be noted that the operations 308 and 310 may be optional and may be executed only when gross or aggregate verification of the color values in the frames is needed.

At 312, an operation for audio component determination may be executed. The circuitry 202 may be configured to determine whether an audio component is included in the received first media file 302A or not. For example, the circuitry 202 may retrieve audio metadata associated with the received first media file 302A. Based on the retrieved audio metadata associated with the received first media file 302A, the circuitry 202 may determine whether the received first media file 302A includes the audio component. In an example, the audio metadata may include parameters such as, codec name, codec type, and the like, which may indicate whether an audio component is present in the received first media file 302A.

At 314, an operation for a retrieval of audio values may be executed. The circuitry 202 may be configured to retrieve one or more audio values, such as the audio values 314A for the plurality of frames associated with received first media file 302A. Herein, one or more audio values such as, the audio value 312A, may correspond to information including an intensity, an amplitude, a pitch, a frequency, and the like, of audio for the plurality of frames associated with received first media file 302A. As, the received first media file 302A may be the video, the first media file 302A may include both the audio component and a video component. The audio component across the plurality of frames or across the first media file 302A may be analyzed to determine the one or more audio values. In an example, the one or more audio values over the plurality of frames associated with received first media file 302A may have an intensity in dB (like 25 dB) and a frequency in Hz (like 180 Hz).

At 316, an operation for a third value determination may be executed. The circuitry 202 may be further configured to determine the third value 316A, based on the retrieved one or more audio values (e.g., the audio value 312A). The third value 316A may be represented as a numeric value that may be determined based on an application of a transformation function (e.g., a hash function) on the retrieved one or more audio values (e.g., the audio value 312A). In an example, the one or more audio values over the plurality of frames (associated with received first media file 302A) may correspond to an intensity in dB (like 15 dB) and a frequency in Hz (like 150 Hz). The circuitry 202 may apply an algorithm (e.g., based on the transformation function) to convert the one or more audio values to the third value 316A, which may be a numeric, character, or alpha-numeric string of 128 bits. It may be noted that the technique for determining the first value 306A and the third value 316A may or may not differ. Further, the third value 316A may be determined over a different number of frames as compared to the second value 310A.

At 318, an operation for first information determination may be executed. The circuitry 202 may be further configured to determine the first information 318A associated with the received first media file 302A, based on the determined second value 310A and the determined third value 316A. In an embodiment, the determined second value 310A and the determined third value 316A may be combined. For example, the determined third value 316A may be added (for example, based on a weighted summation or a weighted average) to the determined second value 310A in order to determine the first information 318A. Thus, the first information 318A may include values associated with both the audio component and the video component of the received first media file 302A. It may be noted that the first information 318A may be determined from a single frame of the video or from the plurality of frames including several frames. Herein, the determined first information 318A may be tagged as a part of the plurality of frames.

In an embodiment, the first media file 302A may correspond to a mute video including a set of images and excluding an audio component. It may be appreciated that the mute video may not have sound and thus, may not include the audio component. However, the mute video may include the set of images that may be played sequentially to obtain the mute video. It may be noted that the set of images may be the plurality of frames of the mute video.

In an embodiment, the determined first information 318A associated with the mute video corresponds to the determined second value 310A. The mute video may not include the audio component. Hence, the one or more audio values such as, the audio values 314A may be negligible or absent from the received first media file 302A. Therefore, the mute video may not include the third value 316A, and the determined first information 318A may correspond to the determined second value 310A.

At 320, an operation for first information transmission may be executed. The circuitry 202 may be configured transmit the determined first information 318A associated with the received first media file 302A to the plurality of databases 322 (e.g., the set of value vaults 112 of FIG. 1) for storage, wherein each database of the plurality of databases 322 may be associated with the separate entity. The transmitted first information 318A may be further retrieved from each database of the plurality of databases 322, and the retrieved first information may be used to determine whether a second media file (e.g., the second media file 110B), corresponding to the received first media file 302A, is unaltered or not. The retrieval of the first information to determine whether a second media file is unaltered or not is described further, for example, in U.S. application Ser. No. 16/949,846, which was filed on Sep. 21, 2022).

It may be noted that each database of the plurality of databases 322 may be associated with the separate entity, and the separate entity associated with each database of the plurality of databases 322 may be unconnected to other entities associated with other databases of the plurality of database 322. The plurality of databases 322 may include more than two databases. The plurality of databases 322 may have no contact, cooperation, or collusion with each other. The transmitted first information 318A may be stored in each of the plurality of databases 322. When a given media file needs to be verified, the first information 318A corresponding to the given media file may be fetched from each of the plurality of databases 322 and may be compared with second information determined for the given media file. However, it may be noted that in case a database of the plurality of databases 322 is compromised, an incorrect version of the first information 318A may be received from the particular database. However, since the other databases of the plurality of databases 322 may be maintained by separate entities and may not communicate or collude, the other databases may still be uncompromised and may include the correct version of the first information 318A. Thus, not all databases of the plurality of databases 322 may be compromised at one time. To ensure that the compromised database does not affect a verification of media file (e.g., the second media file 110B), the plurality of databases 322 may include at least three databases.

In an embodiment, each database of the plurality of databases 322 may correspond to a node of a distributed ledger. For example, the distributed ledger may store several blocks of data in the form of chain (e.g., a blockchain). The distributed leger of the present disclosure may be associated with each database of the plurality of databases 322 and may store the first information 318A for each database of the plurality of databases 322 securely.

In an embodiment, the circuitry 202 may be further configured to encrypt the determined second value 310A and the determined third value 316A of the received first media file 302A. The first information 318A associated with the received first media file 302A may be determined based on the encrypted second value and the encrypted third value. It may be noted that in various scenarios, the first media file 302A may be sensitive or confidential information that may not be accessed by unauthorized persons. Hence, the first information 318A associated with the received first media file 302A may be encrypted for information security. The encryption may convert the determined second value 310A and the determined third value 316A of the received first media file 302A into an encoded value that may be accessed or modified by only authorized persons. The determined first information 318A may include the encrypted second value and the encrypted third value. Thus, even if anyone accesses the determined first information 318A when the determined first information 318A is transmitted, the person may not be able to eavesdrop and/or modify the determined first information 318A due to the encryption.

In an embodiment, the transmitted first information 318A may be retrieved from each database of the plurality of databases 322. Further, the retrieved first information, such as the first information 318A, may be decrypted based on a decryption of the encrypted second value and the encrypted third value. As the first information (such as, the first information 318A) stored in the plurality of databases 322 is encrypted, hence upon retrieval of the first information\, the circuitry 202 may decrypt the retrieved first information. The circuitry 202 may decrypt the encrypted second value and the encrypted third value to obtain the first information 318A.

Typically, video files may be modified by a user using various computer applications or online tools. For example, the user may remove certain frames of an original video and add certain extra frames in the video that may not be present in the original video. In some cases, the original video may include information that may be critical for some purposes, such as, in case of legal proceedings or surveillance. Hence, an authenticity of the video may need to be determined. The electronic device 102 may determine the first value 306A for each row in the frame of the received first media file 302A, based on the retrieved one or more color values (e.g., color values 304A). The electronic device 102 may combine the determined first value 306A for the predefined set of frames of the plurality of frames associated with the received first media file 302A. The electronic device 102 may determine the second value 310A based on the combination of the determined first value 306A for each of the predefined set of frames of the plurality of frames. The electronic device 102 may retrieve one or more audio values (e.g., the audio values 314A) for the plurality of frames associated with received first media file 302A. The electronic device 102 may determine the third value 316A, based on the retrieved one or more audio values (e.g., the audio values 314A). The electronic device 102 may determine the first information 318A associated with the received first media file 302A, based on the determined second value 310A and the determined third value 316A. The electronic device 102 may transmit the determined first information 318A associated with the received first media file 302A to the plurality of databases 322 for storage, wherein each database of the plurality of databases 322 may be associated with the separate entity. During the media verification (as described in U.S. application Ser. No. 16/949,846, which was filed on Sep. 21, 2022), the transmitted first information 318A may be retrieved from each database of the plurality of databases 322. Further, and the retrieved first information 318A may be used to determine whether the second media file 110B, corresponding to the received first media file 302A, is unaltered or not. The size of the first information 318A may be much less than the size of the first media file 302A itself. Thus, the verification of a media file based on the first information 318A may be more efficient and less time consuming than the verification of the media file based on the first media file 302A itself.

As the first information 318A may be transmitted to multiple databases that may be maintained by separate entities, in case values in the first information 318A are altered at one of the databases, the corresponding values in the first information 318A stored at the other databases may still be unaffected. In other words, the first information 318A may be stored in silos at each database and change of values of the first information 318A in one database may not affect the first information 318A stored at the other databases. Thus, the first information 318A stored on the multiple databases, that may be maintained by separate entities, may be robust to alterations. As the first information 318A may be robust to alterations, when the first information 318A is retrieved from each such database, an authenticity and integrity of the second media file 110B (that may correspond to the first media file 302A) may be accurately verified, based on the retrieved first information 318A. An exemplary electronic device and method for media file verification (based on, for example, the first information associated with a media file) is described further, for example, in U.S. application Ser. No. 16/949,846, which was filed on Sep. 21, 2022).

Figure 4:
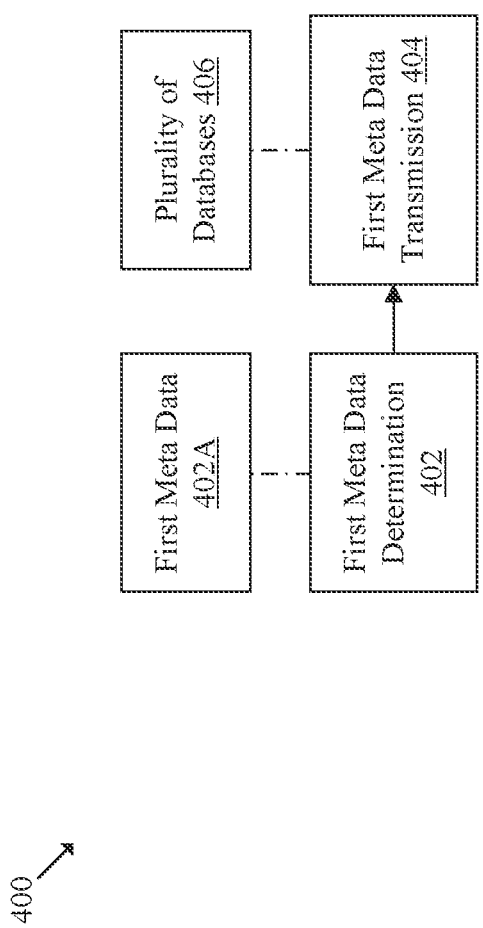
FIG. 4 is a diagram that illustrates an exemplary processing pipeline for implementation of value generation for distributed video content verification using metadata, in accordance with an embodiment of the disclosure.

FIG. 4 is a diagram that illustrates an exemplary processing pipeline for implementation of value generation for distributed video content verification using metadata, in accordance with an embodiment of the disclosure. FIG. 4 is explained in conjunction with elements from FIG. 1, FIG. 2, and FIG. 3. With reference to FIG. 4, there is shown an exemplary processing pipeline 400 that illustrates exemplary operations from 402 to 404 for implementation of value generation for distributed video content verification using metadata. The exemplary operations 402 to 404 may be executed by any computing system, for example, by the electronic device 102 of FIG. 1 or by the circuitry 202 of FIG. 2. The exemplary processing pipeline 400 further illustrates first metadata 402A and a plurality of databases 406.

At 402, an operation for first metadata determination may be executed. The circuitry 202 may be configured to determine the first metadata 402A associated with the received first media file (such as, the received first media file 302A of FIG. 3), based on the determined first information (such as, the determined first information 318A of FIG. 3). It may be noted that metadata may provide information about another data. The first metadata 402A may provide information of and point towards (e.g., based on a uniform resource locator) the first media file (such as, the received first media file 302A of FIG. 3). The first metadata 402A associated with the received first media file (such as, the received first media file 302A of FIG. 3) may correspond to the received first media file 302A. The circuitry 202 may determine the first metadata 402A associated with the received first media file (such as, the received first media file 302A of FIG. 3) based on the determined first information (such as, the determined first information 318A of FIG. 3).

In an embodiment, the determined first metadata 402A associated with the received first media file may include at least one of a time stamp, a start time, an end time, an identification associated with a media source, an individual login associated with the media source, or a number of data units of the first media file 108B. As discussed, the first metadata 402A may provide information related to the first media file 108B. The time stamp may be a time duration associated with a reception of the first media file 108B by the electronic device 102. The start time may be a time at which a reception of the first media file 108B may start from the media source or a storage device to the electronic device 102. The end time may be time at which a reception of the first media file 108B from the media source to the electronic device 102 may end. For example, if the electronic device 102 starts to receive a CCTV footage from a camera located within a bank at "12.10 hours" and stops to receive the CCTV footage from the camera at "16.20 hours". In such case, the start time may be "12.10 hours", the end time may be "16.20 hours", and the time stamp may be "12.10 hours" to "16.20 hours". The identification associated with the media source may be an identification (ID) number associated with the media source. It may be appreciated that each media source may have a unique ID, in order to identify the media source. The individual login associated with the media source may include login information that the media source may use to store the determined first information (such as, the determined first information 318A of FIG. 3) on each of the plurality of databases 406. It may be noted that the plurality of databases 406 may store the determined first information (such as, the determined first information 318A of FIG. 3) associated with the first media file (such as, the first media file 302A of FIG. 3) received from only authorized media sources. Thus, in order to store the determined first information (such as, the determined first information 318A of FIG. 3) associated with the first media file (such as, the first media file 302A of FIG. 3), the media source may login to the plurality of databases 406 based on the login information associated with the media source. The number of data units of the first media file (such as, the first media file 302A of FIG. 3) may correspond to a size of the first media file (such as, the first media file 302A of FIG. 3).

At 404, an operation for first metadata transmission may be executed. The circuitry 202 may be configured the transmit, to each of the plurality of databases 406, the determined first metadata 402A associated with the first media file (such as, the first media file 302A of FIG. 3). the first metadata 402A may correspond to the received first information (such as, the first information 318A of FIG. 3). Once the first metadata 402A associated with the received first media file (such as, the first media file 302A of FIG. 3) is determined based on the received first media file (such as, the first media file 302A of FIG. 3), the electronic device 102 may transmit the determined first metadata 402A to the plurality of databases 406 for storage. In an embodiment, the received first media file (such as, the received first media file 302A of FIG. 3) and the determined first metadata 402A may be transmitted together to the plurality of databases 406. In another embodiment, the received first media file (such as, the received first media file 302A of FIG. 3) and the determined first metadata 402A may be transmitted separately to the plurality of databases 406. In some embodiments, the determined first metadata 402A may be encrypted before transmission for secure transmission of the determined first metadata 402A. Further, the transmitted first metadata 402A may be retrieved from each database of the plurality of databases 406, and the retrieved first metadata 402A may be used to further determine whether the second media file 110B, corresponding to the received first media file (such as, the first media file 302A of FIG. 3), is unaltered or not. The transmitted first metadata 402A may be retrieved during the media verification (as described in U.S. application Ser. No. 16/949,846, which was filed on Sep. 21, 2022). The transmitted first metadata, that may be stored in each database of the plurality of databases 406, may be retrieved from each database of the plurality of databases 406. In such case, the circuitry 202 may request each of the plurality of databases 406 to transmit the first metadata 402A stored on each of the plurality of databases 406. Each of the plurality of databases 406 may verify the request and may provide the stored first metadata 402A to the electronic device 102. The retrieved first metadata such as, the first metadata 402A, may be used to further determine whether the second media file 110B, corresponding to the received first media file (such as, the first media file 302A of FIG. 3), is unaltered based on comparison of the retrieved first metadata 402A with metadata associated with the second media file 110B.

Figure 5:
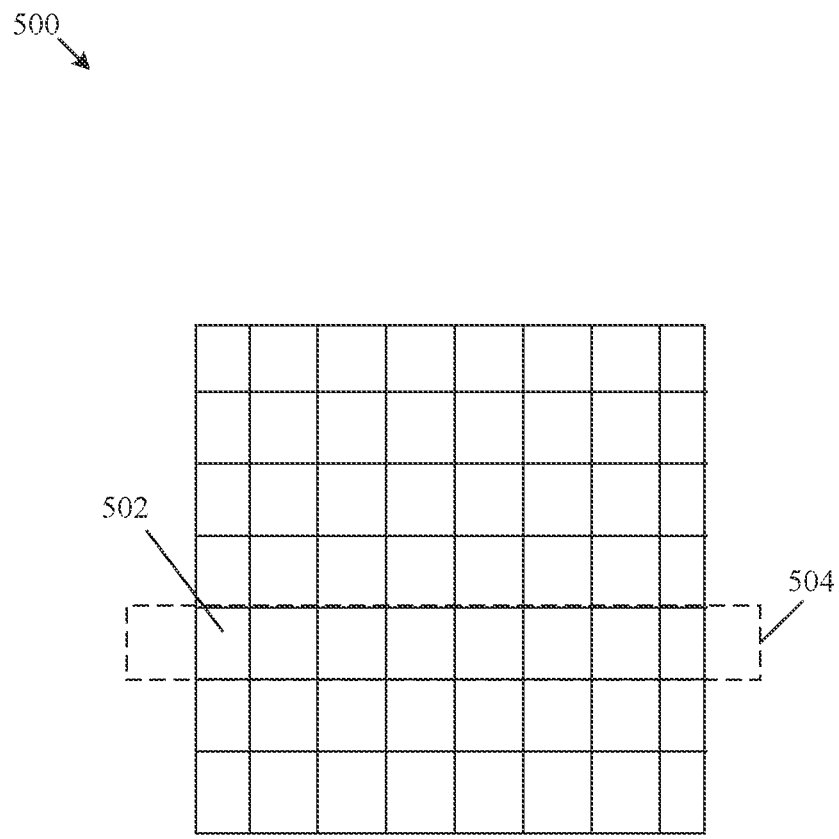
FIG. 5 is a diagram that illustrates an exemplary video frame, in accordance with an embodiment of the disclosure.

FIG. 5 is a diagram that illustrates an exemplary video frame, in accordance with an embodiment of the disclosure. FIG. 5 is described in conjunction with elements from FIG. 1, FIG. 2, FIG. 3, and FIG. 4. With reference to FIG. 5, there is shown an exemplary video frame 500. The video frame 500 (or an image associated with a single frame of a video) includes a set of pixels 502 and a row 504. The video frame 500 may be similar to a frame of the plurality of frames of a media file (such as, the first media file 108B or the second media file 110B), which may correspond to a pre-recorded or live video.

In an embodiment, the circuitry 202 may retrieve one or more color values (e.g., the color values 304A) of each row in the video frame 500 of the plurality of frames associated with the received first media file 108B. The retrieval of the one or more color from the plurality of frames of the received first media file 108B is described, for example, in FIG. 3 (at 304). For example, the circuitry 202 may retrieve one or more color values of the row 504 based on pixels values of each pixel such as, the pixel 502, of the row 504.

It should be noted that the video frame 500 is for exemplary purposes and should not be construed to limit the scope of the disclosure.

Figure 6A:
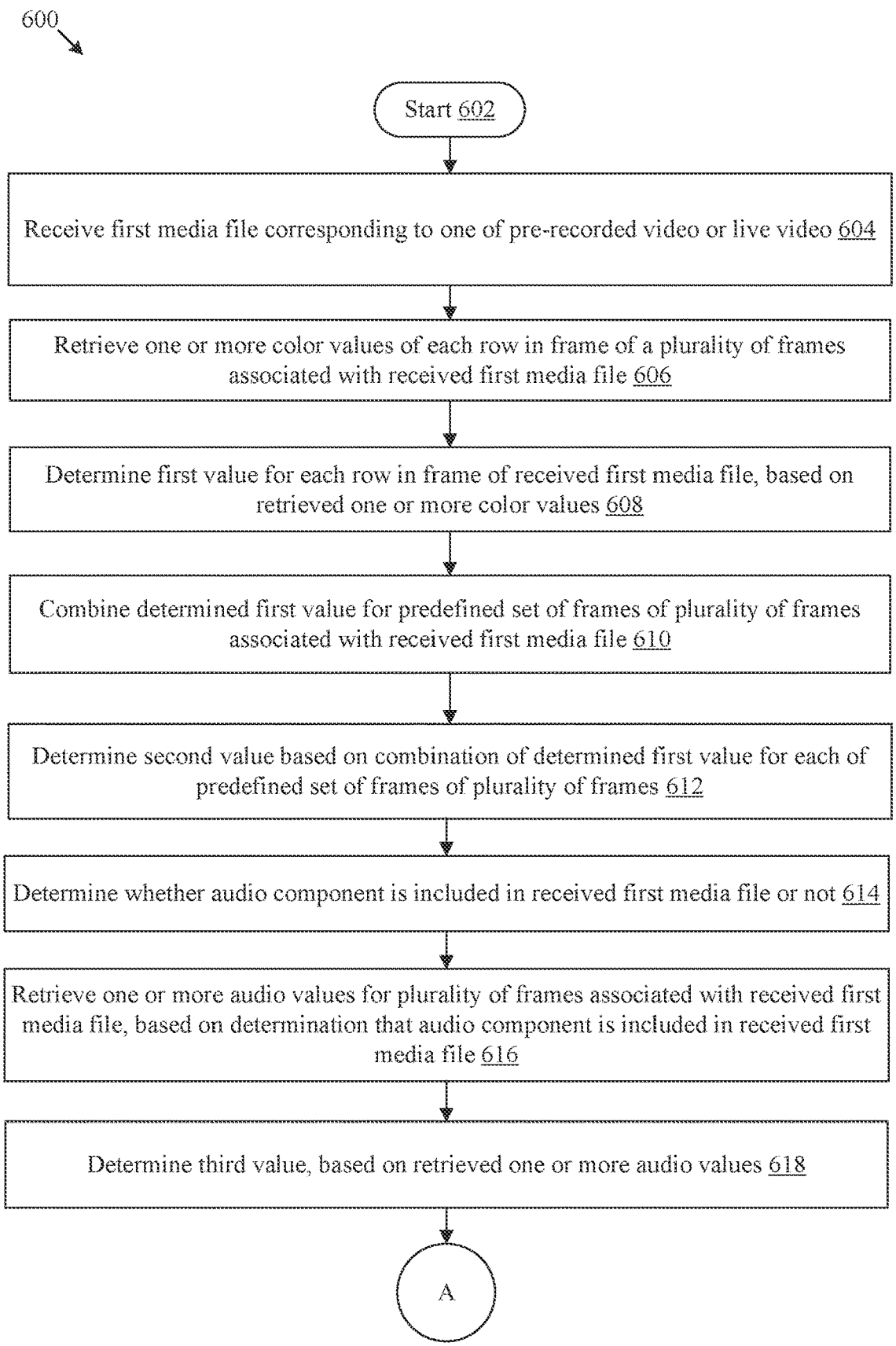
FIGS. 6A and 6B collectively depict a flowchart that illustrates operations of an exemplary method for value generation for distributed video content verification, in accordance with an embodiment of the disclosure.
Figure 6B:
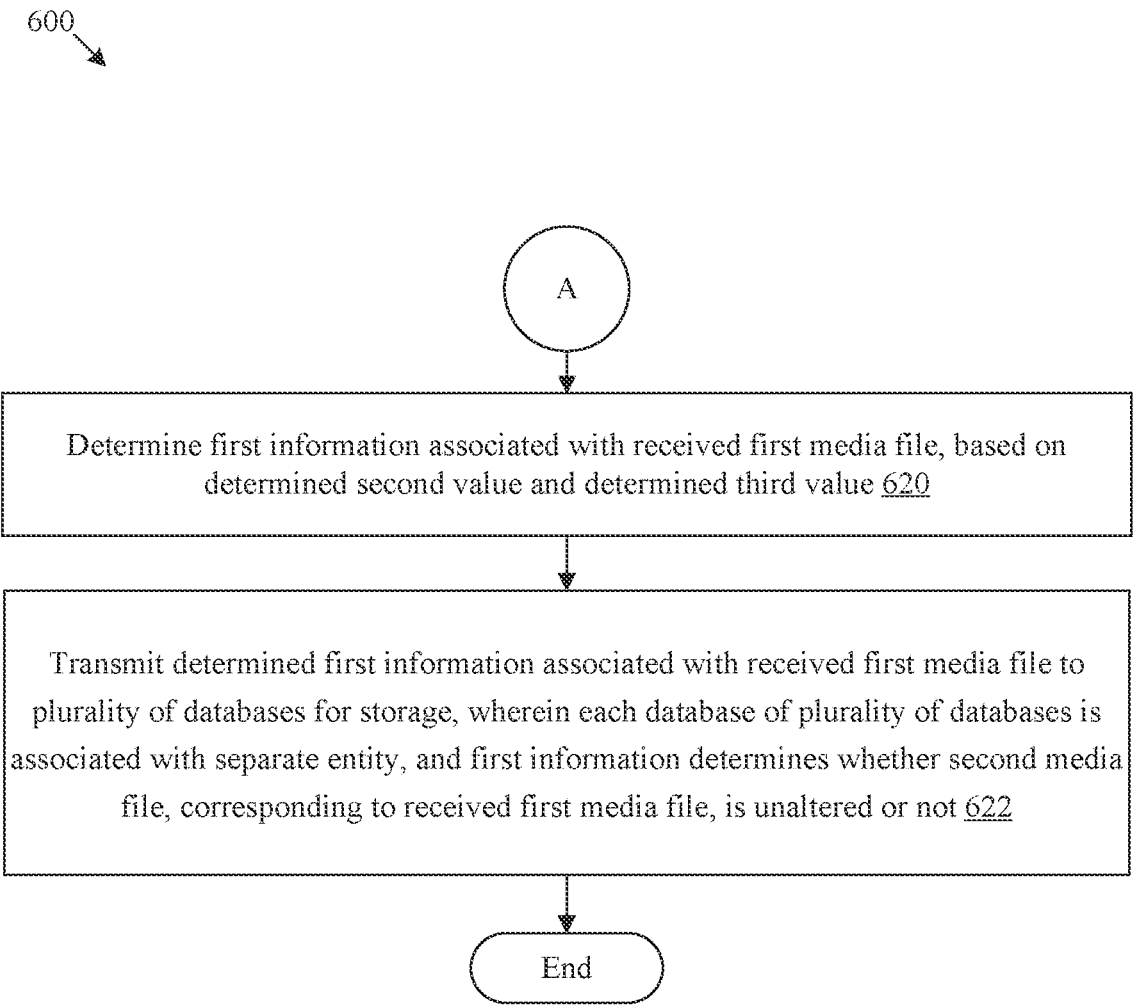

FIGS. 6A and 6B collectively depict a flowchart that illustrates operations of an exemplary method for value generation for distributed video content verification, in accordance with an embodiment of the disclosure. FIGS. 6A and 6B are described in conjunction with elements from FIG. 1, FIG. 2, FIG. 3, FIG. 4, and FIG. 5. With reference to FIGS. 6A and 6B, there is shown a flowchart 600. The flowchart 600 may include operations from 602 to 620 and may be implemented by the electronic device 102 of FIG. 1 or by the circuitry 202 of FIG. 2. The flowchart 600 may start at 602 and proceed to 604.

At 604, the first media file corresponding to one of the pre-recorded video or the live video may be received. The circuitry 202 may be configured to receive the first media file 302A corresponding to one of the pre-recorded video or the live video. The pre-recorded video may be a video that may be recorded prior to the generation of the first information (such as, the first information 318A). The live video may be a video that may be recorded in real-time with respect to the generation of the first information (such as, the first information 318A). The circuitry 202 may receive either the pre-recorded video or the live video. Details related to the first media file reception are described further, for example, in FIG. 3 (at 302).

At 606, one or more color values of each row in the frame of the plurality of frames associated with the received first media file (such as, the received first media file 302A) may be retrieved. The circuitry 202 may be further configured to retrieve one or more color values such as, the color values 304A, of each row in the frame of the plurality of frames associated with the received first media file. An example of the row in the frame associated with the first media file is described, for example, in FIG. 5. Each color value may include a red component, a green component, and a blue component. For example, a color value may include a value of "200" as the red component, a value of "100" as the green component, and a value of "10" as the blue component. It may be appreciated that the frame may be an image in the video and the video may include the plurality of such frames. The circuitry 202 may select the frame from the plurality of frames and may retrieve one or more color values (such as, the color values 304A of FIG. 3) from each row of the frame. Details related to the retrieval of one or more color values are described further, for example, in FIG. 3 (at 304).

At 608, the first value may be determined for each row in the frame of the received first media file (such as, the received first media file 302A of FIG. 3), based on the retrieved one or more color values, (such as, the color values 304A of FIG. 3). The circuitry 202 may be configured to determine the first value 306A for each row in the frame of the received first media file, based on the retrieved one or more color values. The first value 306A may represent the retrieved one or more color values as a numeric value. In an embodiment, the first value 306A may be determined for the one or more color values of each row based on a hash algorithm that may convert the one or more color values to a string of binary "0" and "1" of a predefined number of bits (e.g., sixteen bits). Alternatively, the first value 306A may be determined for one or more color values of each row based on a summation, an XOR, or an average of the one or more color values. The operations 606 and 608 may be repeated for each row in each frame of the plurality of frames. Thus, the first value 306A may be determined for one or more color values for each row in each frame of the plurality of frames of the video corresponding to the first media file 108B. Details related to the first value are described further, for example, in FIG. 3 (at 306).

At 610, the determined first value for the predefined set of frames of the plurality of frames (associated with the received first media file (such as, the received first media file 302A of FIG. 3)) may be combined. The circuitry 202 may be further configured to combine the determined first value 306A for the predefined set of frames of the plurality of frames associated with the received first media file 302A. The predefined set of frames may be the subset of the plurality of frames whose determined first value 306A may be needed to be combined. As the plurality of frames may include large number of frames such as, 10,000 frames, a transmission of the determined first value 306A for each of the predefined set of frames may consume considerable amount of time and bandwidth. Hence, the determined first value 306A for each row of each frame of the predefined set of frames may be combined to reduce data size. For example, for every 20 frames (i.e., the predefined set of frames), the first value 306A per row per frame of the set of 20 frames may be combined. Details related to the determined first value combination are described further, for example, in FIG. 3 (at 308).

At 612, the second value may be determined based on the combination of the determined first value for each of the predefined set of frames of the plurality of frames. The circuitry 202 may be configured to determine the second value 310A based on the combination of the determined first value for each of the predefined set of frames of the plurality of frames. The second value 310A may be a gross value for the predefined set of frames of the plurality of frames associated with the received first media file (such as, the received first media file 302A of FIG. 3). For example, for every 15 frames, the first values 306A per row per frame of the 15 frames may be combined based on a summation of the determined first value 306A of each frame to determine the second value 310A. It may be noted that the operations 608 and 610 may be optional and may be executed only when gross verification may be needed. Details related to the second value determination are described further, for example, in FIG. 3 (at 310).

At 614, it may be determined whether an audio component is included in the received first media file 302A or not.

In an embodiment, the circuitry 202 may be configured to determine whether the audio component is included in the received first media file 302A or not. For example, the first media file 302A may include audio metadata. The circuitry 202 may retrieve the audio metadata and based on the retrieved audio metadata, the circuitry 202 may determine whether the audio component is included in the received first media file 302A or not. The determination of whether the audio component is included in the first media file or not is described further, for example, in FIG. 3 (at 312).

At 616, the one or more audio values for the plurality of frames associated with received first media file (such as, the received first media file 302A of FIG. 3) may be retrieved, based on the determination that the audio component is included in the received first media file 302A. The circuitry 202 may be configured to retrieve one or more audio values (e.g., the audio values 314A) for the plurality of frames associated with received first media file 302A, based on the determination that the audio component is included in the received first media file 302A. The one or more audio values (e.g., the audio values 314A) may correspond to information of the audio component for the plurality of frames associated with received first media file 302A. Details related to the retrieval of the one or more audio values are described further, for example, in FIG. 3 (at 314).

At 618, the third value may be determined based on the retrieved one or more audio values. The circuitry 202 may be further configured to determine the third value 316A, based on the retrieved one or more audio values (e.g., the audio values 314A). The third value 316A may be represented as a numeric value that may be determined based on an application of a transformation function (e.g., a hash function) on the retrieved one or more audio values (e.g., the audio values 314A). Details related to the third value determination are described further, for example, in FIG. 3 (at 316).

At 620, the first information associated with the received first media file may be determined based on the determined second value (such as, the determined second value 310A of FIG. 3) and the determined third value (such as, the determined third value 316A of FIG. 3). The circuitry 202 may be further configured to determine the first information 318A (associated with the received first media file 302A), based on the determined second value 310A and the determined third value 316A. In an embodiment, the determined second value 310A and the determined third value 316A may be combined to determine the first information 318A. The first information 318A may be determined from one frame of the video or from the plurality of frames including several frames. Details related to the first information determination are described further, for example, in FIG. 3 (at 318).

At 622, the determined first information associated with the received first media file may be transmitted to the plurality of databases (for storage, wherein each database of the plurality of databases 322 may be associated with the separate entity, and wherein the first information 318A determines whether the second media file 110B, corresponding to the received first media file 302A, is unaltered or not. The circuitry 202 may be configured to transmit the determined first information 318A associated with the received first media file 302A to the plurality of databases 322 for storage, wherein each database of the plurality of databases 322 may be associated with the separate entity. The first information 318A determines whether the second media file 110B, corresponding to the received first media file 302A, is unaltered or not. Details related to the first information transmission are described further, for example, in FIG. 3 (at 320). Control may pass to end.

Although the flowchart 600 is illustrated as discrete operations, such as, 604, 606, 608, 610, 612, 614, 616, 618, 620, and 622 the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include reception of a first media file (such as, the first media file 302A of FIG. 3) corresponding to one of a pre-recorded video or a live video. The operations may further include retrieval of one or more color values (such as, the color values 304A of FIG. 3) of each row in a frame of a plurality of frames associated with the received first media file 302A. The operations may further include determination of a first value (such as, the first value 306A of FIG. 3) for each row in the frame of the received first media file 302A, based on the retrieved one or more color values (such as, the color values 304A). The operations may further include combination of the determined first value for a predefined set of frames of the plurality of frames associated with the received first media file 302A. The operations may further include determination of a second value (such as, the second value 310A of FIG. 3) based on the combination of the determined first value 306A for each of the predefined set of frames of the plurality of frames. The operations may further include determination of whether an audio component is included in the received first media file 302A or not. The operations may further include retrieval of one or more audio values (such as, the audio values 314A of FIG. 3) for the plurality of frames associated with received first media file 302A, based on the determination that the audio component is include in the received first media file 302A. The operations may further include determination of a third value (such as, the third value 316A of FIG. 3), based on the retrieved one or more audio values (such as, the audio values 314A). The operations may further include determination of a first information (such as, the first information 318A of FIG. 3) associated with the received first media file 302A, based on the determined second value 310A and the determined third value 316A. The operations may further include transmission of the determined first information (such as, the first information 318A) associated with the received first media file 302A to a plurality of databases (such as, the plurality of databases 322 of FIG. 3) for storage, wherein each database of the plurality of databases 322 may be associated with a separate entity. The first information 318A determines whether a second media file (e.g., the second media file 110B), corresponding to the received first media file 302A, is unaltered or not.

Exemplary aspects of the disclosure may provide an electronic device (such as, the electronic device 102 of FIG. 1) that includes circuitry (such as, the circuitry 202). The circuitry 202 may be configured to receive a first media file (such as, the first media file 302A of FIG. 3) corresponding to one of a pre-recorded video or a live video. The circuitry 202 may be further configured to retrieve one or more color values (such as, the color values 304A of FIG. 3) of each row in a frame of a plurality of frames associated with the received first media file 302A. The circuitry 202 may be further configured to determine a first value (such as, the first value 306A of FIG. 3) for each row in the frame of the received first media file 302A, based on the retrieved one or more color values (such as, the color values 304A). The circuitry 202 may be further configured to combine the determined first value 306A for a predefined set of frames of the plurality of frames associated with the received first media file 302A. The circuitry 202 may be further configured to determine a second value (such as, the second value 310A of FIG. 3) based on the combination of the determined first value 306A for each of the predefined set of frames of the plurality of frames. The circuitry 202 may be further configured to determine whether an audio component is included in the received first media file 302A or not. The circuitry 202 may be further configured to retrieve one or more audio values (such as, the audio values 314A of FIG. 3) for the plurality of frames associated with received first media file 302A, based on the determination that the audio component is included in the received first media file 302A. The circuitry 202 may be further configured to determine a third value (such as, the third value 316A of FIG. 3), based on the retrieved one or more audio values (such as, the audio values 314A). The circuitry 202 may be further configured to determine a first information (such as, the first information 318A of FIG. 3) associated with the received first media file 302A, based on the determined second value 310A and the determined third value 316A. The circuitry 202 may be further configured to transmit the determined first information 318A associated with the received first media file 302A to a plurality of databases (such as, the plurality of databases 322 of FIG. 3) for storage, wherein each database of the plurality of databases 322 may be associated with a separate entity. The first information 318A determines whether a second media file (e.g., the second media file 110B), corresponding to the received first media file 302A, is unaltered or not.

In an embodiment, each database of the plurality of databases 322 may correspond to a node of a distributed ledger.

In an embodiment, the circuitry 202 may be further configured to encrypt the determined second value 310A and the determined third value 316A of the received first media file 302A, and wherein the first information 318A associated with the received first media file 302A may be determined based on the encrypted second value and the encrypted third value.

In an embodiment, the transmitted first information 318A may be retrieved from each database of the plurality of databases 322 and the retrieved first information 318A may be decrypted based on a decryption of the encrypted second value and the encrypted third value.

In an embodiment, the circuitry 202 may be further configured to determine first metadata (e.g., the first metadata 402A) associated with the received first media file 302A, based on the determined first information 318A. The circuitry 202 may be further configured to transmit, to each of the plurality of databases 322, the determined first metadata 402A associated with the first media file 302A. The first metadata 402A may correspond to the received first information 318A. Further, the transmitted first metadata 402A may be retrieved from each database of the plurality of databases 322, and the retrieved first metadata 402A may be used to further determine whether the second media file 110B, corresponding to the received first media file 302A, is unaltered or not.

In an embodiment, received first metadata 402A associated with the first media file 302A may include at least one of a time stamp, a start time, an end time, an identification associated with a media source, an individual login associated with the media source, or a number of data units of the first media file 302A.

In an embodiment, the circuitry 202 may be further configured to determine that the first media file 302A corresponds to a mute video including a set of images, based on the determination that the audio component is absent from the received first media file. In an embodiment, the determined first information 318A associated with the mute video may correspond to the determined second value.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
   circuitry configured to:
   receive a first media file corresponding to one of a pre-recorded video or a live video;
   retrieve one or more color values of each row in a frame of a plurality of frames associated with the received first media file;
   determine a first value for each row in the frame of the received first media file, based on the retrieved one or more color values;
   combine the determined first value for a predefined set of frames of the plurality of frames associated with the received first media file;
   determine a second value based on the combination of the determined first value for each of the predefined set of frames of the plurality of frames;
   determine whether an audio component is included in the received first media file or not;
   retrieve one or more audio values for the plurality of frames associated with received first media file, based on the determination that the audio component is included in the received first media file;
   determine a third value, based on the retrieved one or more audio values;
   determine first information associated with the received first media file, based on the determined second value and the determined third value; and
   transmit the determined first information associated with the received first media file to a plurality of databases for storage, wherein
   each database of the plurality of databases is associated with a separate entity, and
   the first information determines whether a second media file, corresponding to the received first media file, is unaltered or not.

2. The electronic device according to claim 1, wherein each database of the plurality of databases corresponds to a node of a distributed ledger.

3. The electronic device according to claim 1, wherein the circuitry is further configured to encrypt the determined second value and the determined third value of the received first media file, and wherein the first information associated with the received first media file is determined based on the encrypted second value and the encrypted third value.

4. The electronic device according to claim 3, wherein
   the transmitted first information is retrieved from each database of the plurality of databases, and
   the retrieved first information is decrypted based on a decryption of the encrypted second value and the encrypted third value.

5. The electronic device according to claim 1, wherein the circuitry is further configured to:
   determine first metadata associated with the received first media file, based on the determined first information; and
   transmit, to each of the plurality of databases, the determined first metadata associated with the received first media file, wherein the first metadata corresponds to the first information, wherein
   the transmitted first metadata is retrieved from each database of the plurality of databases, and
   the retrieved first metadata is used to further determine whether the second media file, corresponding to the received first media file, is unaltered or not.

6. The electronic device according to claim 5, wherein the retrieved first metadata associated with the received first media file includes at least one of a time stamp, a start time, an end time, an identification associated with a media source, an individual login associated with the media source, or a number of data units of the first media file.

7. The electronic device according to claim 1, wherein the circuitry is further configured to determine that the first media file corresponds to a mute video including a set of images, based on the determination that the audio component is absent from the received first media file.

8. The electronic device according to claim 7, wherein the determined first information associated with the mute video corresponds to the determined second value.

9. A method, comprising:
   in an electronic device:
   receiving a first media file corresponding to one of a pre-recorded video or a live video;
   retrieving one or more color values of each row in a frame of a plurality of frames associated with the received first media file;
   determining a first value for each row in the frame of the received first media file, based on the retrieved one or more color values;
   combining the determined first value for a predefined set of frames of the plurality of frames associated with the received first media file;
   determining a second value based on the combination of the determined first value for each of the predefined set of frames of the plurality of frames;
   determining whether an audio component is included in the received first media file or not;

retrieving one or more audio values for the plurality of frames associated with received first media file, based on the determination that the audio component is included in the received first media file;

determining a third value, based on the retrieved one or more audio values;

determining first information associated with the received first media file, based on the determined second value and the determined third value; and transmitting the determined first information associated with the received first media file to a plurality of databases for storage, wherein each database of the plurality of databases is associated with a separate entity, and the first information determines whether a second media file, corresponding to the received first media file, is unaltered or not.

10. The method according to claim 9, wherein each database of the plurality of databases corresponds to a node of a distributed ledger.

11. The method according to claim 9, further comprising encrypting the determined second value and the determined third value of the received first media file, and wherein the first information associated with the received first media file is determined based on the encrypted second value and the encrypted third value.

12. The method according to claim 11, wherein
the transmitted first information is retrieved from each database of the plurality of databases, and
the retrieved first information is decrypted based on a decryption of the encrypted second value and the encrypted third value.

13. The method according to claim 9, further comprising:
determining first metadata associated with the received first media file, based on the determined first information; and
transmitting, to each of the plurality of databases, the determined first metadata associated with the received first media file, wherein the first metadata corresponds to the first information, wherein
the transmitted first metadata is retrieved from each database of the plurality of databases, and
the retrieved first metadata is used to further determine whether the second media file, corresponding to the received first media file, is unaltered or not.

14. The method according to claim 13, wherein the retrieved first metadata associated with the received first media file includes at least one of a time stamp, a start time, an end time, an identification associated with a media source, an individual login associated with the media source, or a number of data units of the first media file.

15. The method according to claim 9, further comprising determining that the first media file corresponds to a mute video including a set of images, based on the determination that the audio component is absent from the received first media file.

16. The method according to claim 15, wherein the determined first information associated with the mute video corresponds to the determined second value.

17. A non-transitory computer-readable medium having stored thereon, computer-executable instructions that when executed by an electronic device, causes the electronic device to execute operations, the operations comprising:

receiving a first media file corresponding to one of a pre-recorded video or a live video;

retrieving one or more color values of each row in a frame of a plurality of frames associated with the received first media file;

determining a first value for each row in the frame of the received first media file, based on the retrieved one or more color values;

combining the determined first value for a predefined set of frames of the plurality of frames associated with the received first media file;

determining a second value based on the combination of the determined first value for each of the predefined set of frames of the plurality of frames;

determining whether an audio component is included in the received first media file or not;

retrieving one or more audio values for the plurality of frames associated with received first media file, based on the determination that the audio component is included in the received first media file;

determining a third value, based on the retrieved one or more audio values;

determining first information associated with the received first media file, based on the determined second value and the determined third value; and transmitting the determined first information associated with the received first media file to a plurality of databases for storage, wherein each database of the plurality of databases is associated with a separate entity, and the retrieved first information determines whether a second media file, corresponding to the received first media file, is unaltered or not.

18. The non-transitory computer-readable medium according to claim 17, wherein the operations further comprise:

determining first metadata associated with the received first media file, based on the determined first information; and transmitting, to each of the plurality of databases, the determined first metadata associated with the received first media file, wherein the first metadata corresponds to the first information, wherein the transmitted first metadata is retrieved from each database of the plurality of databases, and the retrieved first metadata is used to further determine whether the second media file, corresponding to the received first media file, is unaltered or not.

19. The non-transitory computer-readable medium according to claim 18, wherein the retrieved first metadata associated with the received first media file includes at least one of a time stamp, a start time, an end time, an identification associated with a media source, an individual login associated with the media source, or a number of data units of the first media file.

20. The non-transitory computer-readable medium according to claim 17, further comprising
determining that the first media file corresponds to a mute video including a set of images, based on the determination that the audio component is absent from the received first media file, wherein
the determined first information associated with the mute video corresponds to the determined second value.

* * * * *